(12) United States Patent
Akita et al.

(10) Patent No.: US 10,767,705 B2
(45) Date of Patent: Sep. 8, 2020

(54) PROPELLER SHAFT

(71) Applicant: HITACHI AUTOMOTIVE SYSTEMS KYUSHU, LTD., Kouge-machi, Chikujo-gun, Fukuoka (JP)

(72) Inventors: Yasushi Akita, Atsugi (JP); Hiromichi Komai, Hadano (JP)

(73) Assignee: HITACHI AUTOMOTIVE SYSTEMS KYUSHU, LTD., Fukuoka (JP)

( * ) Notice: Subject to any disclaimer, the term of this patent is extended or adjusted under 35 U.S.C. 154(b) by 870 days.

(21) Appl. No.: 15/060,821

(22) Filed: Mar. 4, 2016

(65) Prior Publication Data
US 2016/0273592 A1    Sep. 22, 2016

(30) Foreign Application Priority Data

Mar. 19, 2015    (JP) .................................. 2015-055776

(51) Int. Cl.
  *F16D 3/06*    (2006.01)
  *F16D 3/84*    (2006.01)
  *F16J 15/16*    (2006.01)

(52) U.S. Cl.
  CPC ............... *F16D 3/06* (2013.01); *F16D 3/848* (2013.01); *F16J 15/16* (2013.01)

(58) Field of Classification Search
  CPC ...... F16D 2001/103; F16D 3/848; F16D 3/14; F16D 3/06; F16C 3/03; F16J 15/54; F16J 15/56

(Continued)

(56) References Cited

U.S. PATENT DOCUMENTS 1,496,236 A * 6/1924 Laughlin ................. B60B 35/12
                                                    464/16
1,541,007 A * 6/1925 Thiemer ................... F16D 3/06
                                                    403/359.5

(Continued)

FOREIGN PATENT DOCUMENTS

DE    102013203762 A1 *  9/2014   ............. F16H 7/043
DE    102014008719 B3 *  7/2015   ............. F16D 1/116

(Continued)

OTHER PUBLICATIONS

Constrain—Definition of Constrain by Merriam-Webster. Dictionary [online]. Merriam-Webster, 2019 [retrieved on Nov. 26, 2019]. Retrieved from the Internet: <URL: https://www.merriam-webster.com/dictionary/constrain > (Year: 2019).*

*Primary Examiner* — Greg Binda
(74) *Attorney, Agent, or Firm* — Foley & Lardner LLP

(57) ABSTRACT

In a power transmission shaft including a rear-side shaft having a male spline joint portion formed on the outer periphery of a front end of the rear-side shaft and a tubular front-side shaft having a female spline joint portion formed on the inner periphery of a rear end of the tubular front-side shaft, a seal ring is housed in a seal housing groove configured at the rear end of the tubular front-side shaft. The seal ring is interposed between an outer peripheral seal surface of the rear-side shaft and an inner peripheral surface of the seal housing groove with a compressive deformation. Additionally, the seal ring is sandwiched and retained between the inside wall surface of the seal housing groove and the inside end face of a disk-shaped retainer part of a retainer press-fitted to the rear end of the tubular front-side shaft.

20 Claims, 8 Drawing Sheets

(58) Field of Classification Search
USPC ............ 403/359.1–359.6; 277/912; 464/162
See application file for complete search history.

(56) References Cited

U.S. PATENT DOCUMENTS

| | | | | |
|---|---|---|---|---|
| 1,973,702 | A * | 9/1934 | Cooke | F16D 3/06 464/16 |
| 2,072,090 | A * | 3/1937 | Anderson | F16D 3/06 188/196 C |
| 3,123,990 | A * | 3/1964 | Freeman | F16C 29/08 464/113 |
| 4,131,375 | A * | 12/1978 | Fisher | F16D 3/06 277/912 |
| 6,186,697 | B1 | 2/2001 | Masuda et al. | |
| 6,722,990 | B2 * | 4/2004 | Duggan | F16C 3/03 184/95 |
| 6,755,746 | B2 * | 6/2004 | Barnley | F16D 1/08 403/359.5 |
| 7,052,398 | B2 * | 5/2006 | Robb | F16C 3/03 184/95 |
| 2015/0075897 | A1 * | 3/2015 | Copeland | B60K 17/22 180/383 |
| 2016/0084317 | A1 * | 3/2016 | Akita | F16D 1/10 464/162 |

FOREIGN PATENT DOCUMENTS

| | | |
|---|---|---|
| JP | H05-014624 U | 2/1993 |
| JP | H06-001854 U | 1/1994 |
| JP | H06-059630 U | 8/1994 |
| JP | 2571501 Y | 5/1998 |
| JP | 10-258646 A | 9/1998 |
| JP | H11-230184 A | 8/1999 |
| JP | 2012-051384 A | 3/2012 |

* cited by examiner

PROPELLER SHAFT

TECHNICAL FIELD

The present invention relates to the improved technology of a power transmission shaft that transmits power from a transmission of a vehicle drive road wheels.

BACKGROUND ART

In recent years, a power transmission shaft, for example a propeller shaft which is installed on a vehicle, is equipped at its axial front end with a tubular member and at its axial rear end with a shaft member. The tubular member is connected to the side of a transmission of the vehicle, whereas the shaft member is connected to the side of a differential gear. The rear end of the tubular member and the front end of the shaft member are engaged with each other so as to be relatively movable in the opposite axial directions.

On one hand, the tubular member has a female spline joint portion (an internally-cut, longitudinally-extending keyways or internal splines) formed on the inner peripheral surface of its rear end. On the other hand, the shaft member has a male spline joint portion (an externally-cut, longitudinally-extending keyways or external splines) formed on the outer peripheral surface of its front end. The female spline joint portion of the tubular member and the male spline joint portion of the shaft member are axially engaged with each other by spline-connection, so as to permit axial movement of the tubular member relative to the shaft member. Thus, when an excessive input load is applied from the transmission to the tubular member, for instance, during a vehicle collision, an impact can be absorbed and reduced by virtue of relative movement of the tubular member toward the shaft member.

Also interposed between the rear end of the tubular member and the front end of the shaft member is a stepped boot having large- and small-diameter portions. The boot with the large- and small-diameter portions is made of synthetic rubber and integrally formed into a stepped cylindrical shape. The large-diameter portion (one axial end) of the boot is fixed or retained onto the outer peripheral surface of the rear end of the tubular member by means of a boot band. The small-diameter portion (the other axial end) of the boot is fixed or retained to the outer peripheral surface of the front end of the shaft member by means of a boot band. Hence, the stepped rubber boot, which is fixed in a manner so as to cover the circumference of the spline-connected section of the rear end of the tubular member and the front end of the shaft member, provides a seal around the spline-connected section of the tubular member and the shaft member. One such power transmission shaft has been disclosed in Patent document 1.

CITATION LIST

Patent Literature

Patent document 1: Japanese patent provisional publication No. JPH10-258646 (A) corresponding to U.S. Pat. No. 6,186,697 B1

SUMMARY OF THE INVENTION

However, in the power transmission shaft disclosed in the Patent document 1, such a substantially cylindrical boot is interposed between the rear end of the tubular member and the front end of the shaft member so as to cover their outer peripheral surfaces. The prior-art power transmission device suffers the disadvantages, that is, the large-sized outside diameter of the power transmission shaft enlarged due to the outside diameter of the boot and increased number of parts (leading to increased installation time and manufacturing costs) because of fixing of both ends of the boot by means of respective boot bands.

It is, therefore, in view of the previously-described drawbacks of the prior art, an object of the invention to provide an improved power transmission shaft configured to suppress the outside diameter of the power transmission shaft from enlarging and to suppress the number of parts of the power transmission shaft from increasing, while suppressing an impact absorbing potential from lowering during relative displacements of a tubular member and a shaft member in the two opposite axial directions.

In order to accomplish the aforementioned and other objects of the present invention, a power transmission shaft comprises a first shaft member having a male spline joint portion formed on an outer peripheral surface of at least a first end side of the first shaft member facing a first axial direction of two opposite axial directions, a second shaft member having a female spline joint portion formed on an inner peripheral surface of at least a second end side of the second shaft member facing a second axial direction opposite to the first axial direction, the female spline joint portion being spline-connected to the male spline joint portion by inserting the male spline joint portion of the first shaft member from the second end side of the second shaft member so as to permit axial sliding movement of the second shaft member relative to the first shaft member, a seal member housing formed at the second end side of the second shaft member as a diametrically-enlarged portion whose inside diameter is greater than a diameter of a dedendum circle of the female spline joint portion, for housing a seal member that prevents entry of foreign matters from an outside into a spline-connected section of the female spline joint portion and the male spline joint portion, and a retainer member fixedly connected to the second end side of the second shaft member for defining a first wall of the seal member housing.

According to another aspect of the invention, a power transmission shaft comprises a shaft member having a male spline joint portion formed on an outer peripheral surface of at least a first end side of the shaft member facing a first axial direction of two opposite axial directions, a tubular member having a female spline joint portion formed on an inner peripheral surface of at least a second end side of the tubular member facing a second axial direction opposite to the first axial direction, the tubular member being spline-connected to the shaft member by inserting the first end side of the shaft member from the second end side of the tubular member so as to permit axial sliding movement of the tubular member relative to the shaft member, an axial impact absorbing device structured to absorb an axial impact via relative sliding movement between the female spline joint portion and the male spline joint portion spline-connected to each other, a seal member configured to prevent entry of foreign matters from an outside into a spline-connected section of the female spline joint portion and the male spline joint portion, and a seal member housing structured to house the seal member, the seal member housing being formed of a diametrically-enlarged portion, which is formed at the second end side of the tubular member and configured to have an inside diameter greater than a diameter of a dedendum circle of the female spline joint portion, and a retainer member fixedly connected to the second end side of the tubular member.

According to a further aspect of the invention, a power transmission shaft comprises a first shaft member, a second shaft member having an axial bore configured to axially insert a first end side of the first shaft member facing a first axial direction of two opposite axial directions, from a second end side of the second shaft member facing a second axial direction opposite to the first axial direction, an engagement device structured to permit relative sliding movement between the first shaft member and the second shaft member in the axial bore and to prevent relative rotation between the first shaft member and the second shaft member in the axial bore, a seal member housing formed at the second end side of the second shaft member as a diametrically-enlarged portion whose diameter is greater than an inside diameter of the axial bore, and the diametrically-enlarged portion being configured to have a radially-extending inside wall surface and a cylindrical inner peripheral surface formed continuously from the radially-extending inside wall surface for positioning a seal member in the diametrically-enlarged portion, and for sealing between the first shaft member and the second shaft member, a retainer member fixedly connected to the second end side of the second shaft member and formed with an insertion through hole into which the first shaft member is inserted, and configured to define the seal member housing in cooperation with the diametrically-enlarged portion.

The other objects and features of this invention will become understood from the following description with reference to the accompanying drawings.

DESCRIPTION OF THE PREFERRED EMBODIMENTS

Figure 1:
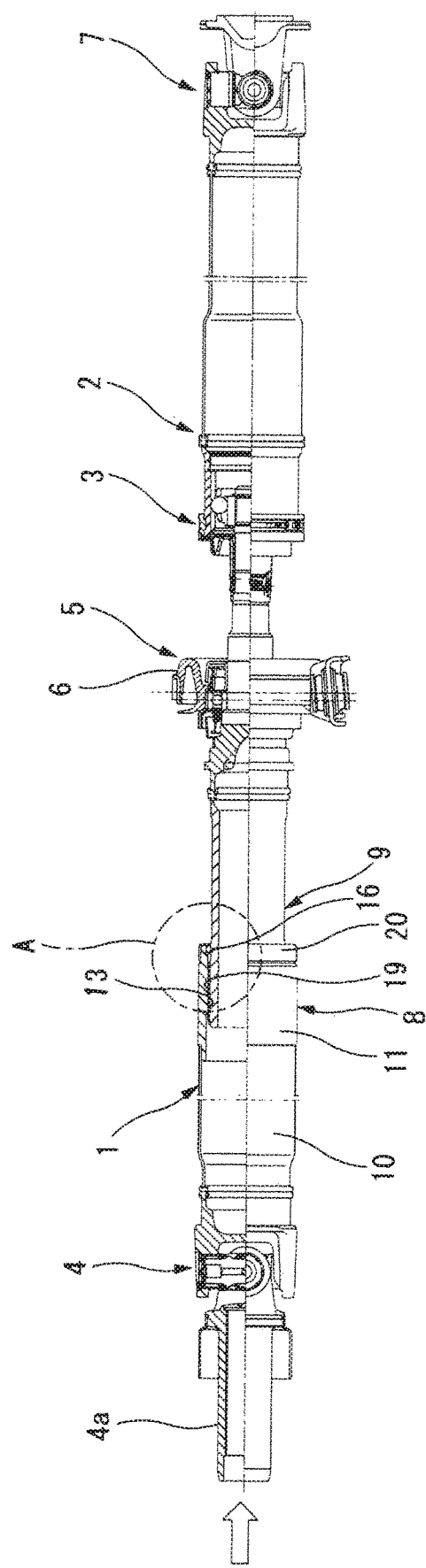
FIG. 1 is a general side view illustrating the first embodiment of a vehicle propeller shaft according to the invention.

Referring now to the drawings wherein the same reference signs designate the same elements (the same parts) throughout the views, a description will be made with regard to a power transmission shaft embodying the invention.

The power transmission shaft of the first embodiment shown in FIGS. 1-4 is exemplified in a vehicle propeller shaft.

First Embodiment

As shown in FIG. 1, the vehicle propeller shaft of the first embodiment is equipped with a shaft 1 of the front side of the vehicle and a shaft 2 of the rear side of the vehicle. The shaft 1 and the shaft 2 are coupled to each other through a constant-velocity joint 3. The front end of the shaft 1 is connected to a transmission (not shown) through a first cruciform joint 4 serving as a first joint mechanism and a transfer shaft 4a. A center bearing 5 is provided at the rear end of the shaft 1. Center bearing 5 is elastically supported by means of a bearing support 6 fixedly connected to the vehicle body, such that the total deflection of the propeller shaft can be suppressed.

On the other hand, the rear end of the shaft 2 is connected to the input shaft of a rear differential (not shown) through a second cruciform joint 7 serving as a second joint mechanism.

As seen from the side view of FIG. 1, the shaft 1 is split into a front-side shaft 8 and a rear-side shaft 9 in the axial direction. The front-side shaft 8 is formed as a vehicle-forward cylindrical-hollow tubular member (a second shaft member), whereas the rear-side shaft 9 is formed as a vehicle-rearward cylindrical-hollow shaft member (a first shaft member).

The front-side shaft 8 is comprised of a first tube 10 and a second tube 11. The first tube 10 is a thin-walled cylindrical-hollow metal tube fixedly connected to the first cruciform joint 4 by friction pressure welding. On the other hand, the second tube 11 is formed as a comparatively thick-walled cylindrical-hollow metal tube axially welded to the rear end of the first tube 10.

Figure 2:
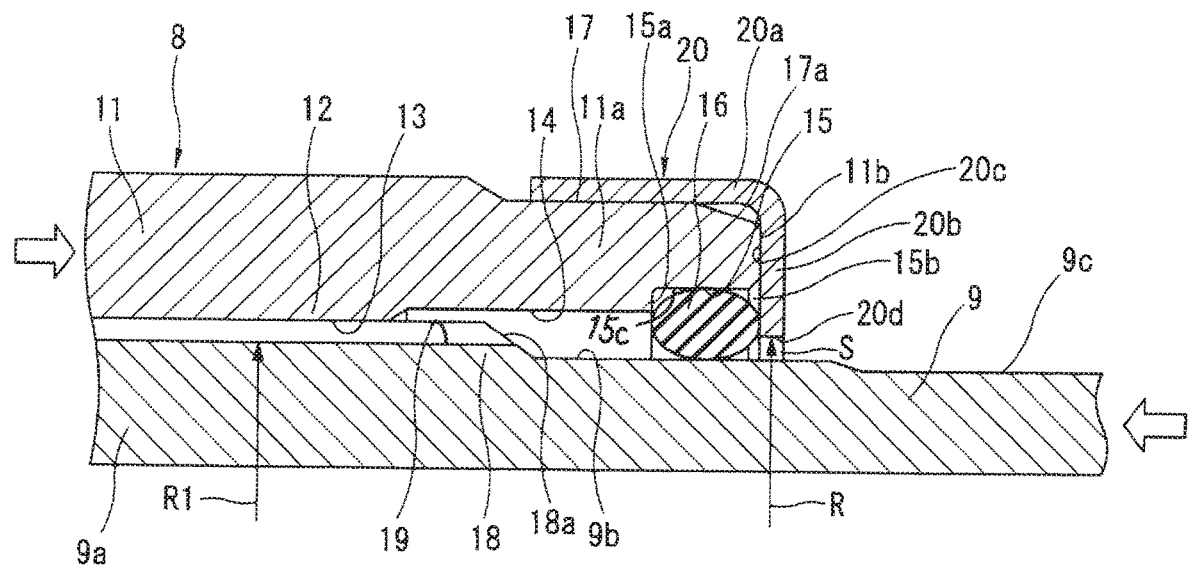
FIG. 2 is an enlarged view of a partial cross-section "A" marked by a circle indicated by one-dotted line in FIG. 1 showing the vehicle propeller shaft of the first embodiment.

As seen from the enlarged partial cross-section of FIG. 2, the second tube 11, constructing part of the front-side shaft 8, has a female-spline-joint formed part 12 configured on the inner circumferential wall section of its rear end 11a for forming a female spline joint portion 13 (that is, female splines or internal splines). As clearly shown in FIG. 2, female spline joint portion 13, which constructs part of the spline joint, is formed on the inner periphery of female-spline-joint formed part 12 and configured as internally-cut, axially-extending female splines. Female-spline-joint formed part 12 is partially formed on the inner circumferential wall section of the rear end side of the second tube 11 and configured or contoured as circumferentially equidistant-spaced keyways around the entire circumference of female-spline-joint formed part 12.

A cylindrical inner peripheral surface 14 is further formed continuously from the rearmost end of female-spline-joint formed part 12 of the second tube 11. The rearmost end of cylindrical inner peripheral surface 14 is formed as a somewhat diametrically-enlarged seal housing annular groove 15 (a seal member housing groove, simply, a seal housing groove) for housing therein a seal ring (described later). The inside diameter of the inner peripheral surface of seal housing groove 15 is dimensioned to be greater than the diameter of a dedendum circle of female spline joint portion 13.

Seal housing groove 15 is formed and cut annularly. The front axial end of the annularly-cut seal housing groove 15 is configured to have a radially-extending inside wall surface 15a. The rear axial end of the annularly-cut seal housing groove 15 is configured to have an annular chamfered opening 15b.

A seal ring 16 is fitted and retained in the seal housing groove 15. Seal ring 16 is made of synthetic rubber and formed into an annular shape. As shown in FIG. 2, under a state where the rear-side shaft 9 has been inserted through the annular chamfered opening 15b into the second tube 11, seal ring 16 is elastically held or retained between an outer peripheral seal surface 9b (described later) of the rear-side shaft 9 and a cylindrical inner peripheral surface 15c of the seal housing groove 15, under compression deformation. One sidewall surface of seal ring 16, facing the female spline joint portion 13, is kept in abutted-engagement with the inside wall surface 15a of seal housing groove 15 for axially forward positioning of seal ring 16. Under this condition, the other sidewall surface of seal ring 16 is arranged to face the annular chamfered opening 15b.

Also, a stepped small-diameter press-fit cylindrical surface 17 is formed on the outer peripheral surface of the rear end 11a of the second tube 11. The distal end portion of the press-fit cylindrical surface 17 of the rear end 11a is machined or chamfered as a beveled edge, that is, a tapered surface 17a. Press-fit cylindrical surface 17 is configured to have a predetermined axial length. An outer cylinder part 20a of a retainer member 20 (described later) is press-fitted onto the press-fit cylindrical surface 17 and fixed and held in place. When press-fitting the outer cylinder part 20a of retainer member 20 onto the press-fit cylindrical surface 17, the tapered surface 17a functions as a guide surface for press-fitting the retainer member 20.

The rear-side shaft 9 is made of metallic material and integrally formed into a cylindrical-hollow shape. The rear-side shaft 9 has a male-spline-joint formed part 18 configured on the outer peripheral surface of the front end 9a of the rear-side shaft 9 for forming a male spline joint portion 19 (that is, male splines or external splines). As clearly shown in FIG. 2, male spline joint portion 19, which constructs part of the spline joint, is formed on the outer periphery of male-spline-joint formed part 18 and configured as externally-cut, axially-extending male splines. The male spline joint portion 19 of the rear-side shaft 9 is configured to engage with the female spline joint portion 13 of the front-side shaft 8 in the axial direction by spline-connection.

The outer peripheral surface of the rear-side shaft 9, positioned rearward relative to the male spline joint portion 19, is formed as the outer peripheral seal surface 9b. The outside diameter of the outer peripheral seal surface 9b is dimensioned to be less than that of the male-spline-joint formed part 18. A stepped small-diameter sliding surface 9c is formed on the outer peripheral surface of the rear-side shaft 9, positioned rearward relative to the outer peripheral seal surface 9b.

Figure 3:
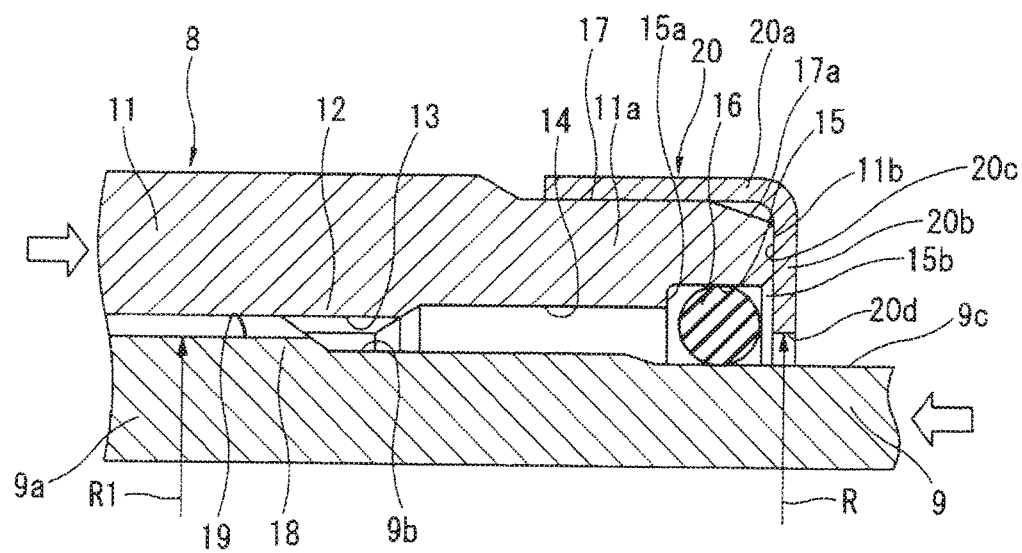
FIG. 3 is an enlarged view in partial longitudinal cross-section illustrating the relative position relation between a shaft member of the front side and a shaft member of the rear side in a retracted state where the front-side shaft member and the rear-side shaft member are axially retracted each other in the vehicle propeller shaft of the first embodiment.
Figure 4:
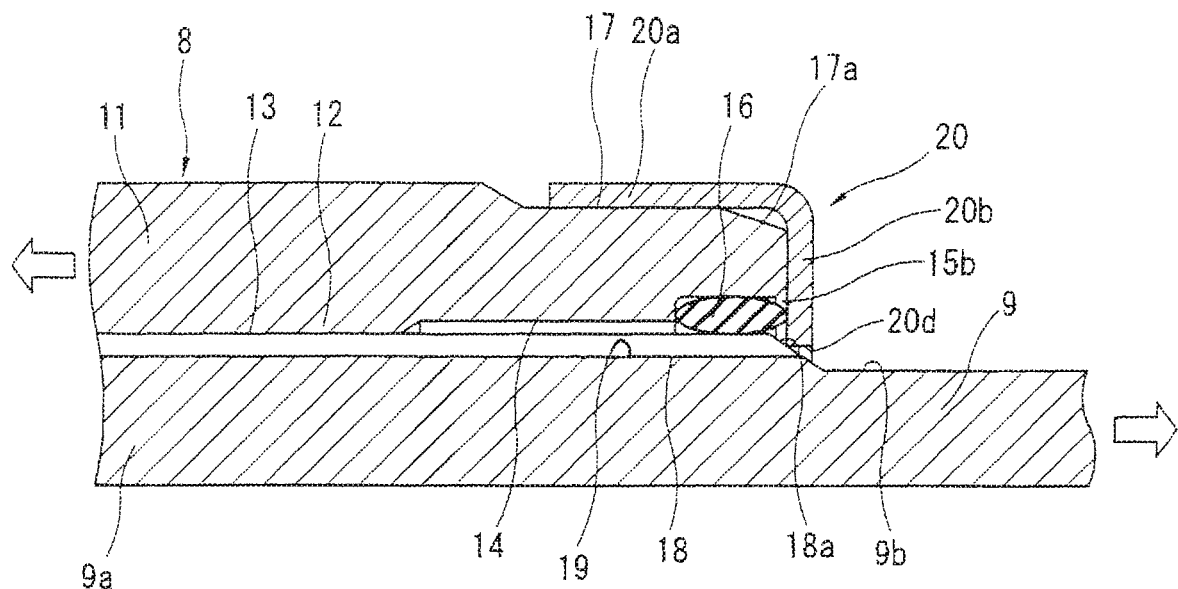
FIG. 4 is an enlarged view in partial longitudinal cross-section illustrating the relative position relation between the front-side shaft member and the rear-side shaft member in an extended state where the front-side shaft member and the rear-side shaft member are axially extended each other in the vehicle propeller shaft of the first embodiment.

As shown in FIGS. 2-4, retainer member 20 is made of an iron-based metal plate and formed and bent into a substantially C-shape in cross-section by pressing. Retainer member 20 is comprised of the outer cylinder part 20a press-fitted onto the press-fit cylindrical surface 17 and a disk-shaped retainer part 20b bent to extend in the direction perpendicular to the axial direction of the second tube 11.

The inside diameter of outer cylinder part 20a is dimensioned to be slightly less than the outside diameter of press-fit cylindrical surface 17, thereby ensuring a press-fit margin. The axial length of outer cylinder part 20a is set or dimensioned to be slightly less than that of press-fit cylindrical surface 17.

At the maximum press-fit position at which retainer member 20 has been press-fitted onto the press-fit cylindrical surface 17 of the second tube 11 to its maximum, the inside end face 20c of retainer part 20b is brought into abutted-engagement with the rearmost end face 11b of the second tube 11, for restricting the maximum press-fitting movement of the retainer member 20 with respect to the rear end 11a of the second tube 11. At the maximum press-fit position, the inside end face 20c of retainer part 20b is configured to cover the annular chamfered opening 15b of seal housing groove 15 and kept in abutted-engagement with the other sidewall surface of seal ring 16. Hence, the inside end face 20c of retainer member 20 cooperates with the inside wall surface 15a of seal housing groove 15 so as to sandwich or retain the seal ring 16 between them. This ensures a simplified seal housing structure.

A central insertion through hole 20d is formed in the center of retainer part 20b. The inside diameter "R" of the central insertion through hole 20d is dimensioned to be substantially equal to the outside diameter "R1" of the male-spline-joint formed part 18 of the rear-side shaft 9. Usually, for instance, in an extended state where the front-side shaft 8 and the rear-side shaft 9 are axially extended each other, as shown in FIG. 2, an annular clearance space "S" is defined between the outer peripheral seal surface 9b of the rear-side shaft 9 and the inner peripheral surface of the insertion through hole 20d.

Furthermore, after the front end 9a of the rear-side shaft 9 has been inserted through the annular chamfered opening 15b into the second tube 11 of the front-side shaft 8 and thus the male spline joint portion 19 of the rear-side shaft 9 has been brought into engagement with the female spline joint portion 13 of the front-side shaft 8, the retainer part 20b of retainer member 20 is deformed and bent radially inward by pressure.

Operation of First Embodiment

With the previously-discussed arrangement, the power transmission shaft of the first embodiment operates as follows:

For instance, during a vehicle collision, when an excessive input load is applied from the side of the transfer through the first cruciform joint 4 to the front-side shaft 8 of the shaft 1 (see the left-hand side voided arrow of FIG. 2), a large force is exerted on the second tube 11 of the front-side shaft 8 in an axially rearward direction such that the second tube 11 is axially displaced toward the rear-side shaft 9 via the spline joint (i.e., female spline joint portion 13 and male spline joint portion 19 spline-connected each other). Also, during a vehicle collision, when an excessive input load is applied from the side of the rear differential through the second cruciform joint 7 to the rear-side shaft 9 of the shaft 1 (see the right-hand side voided arrow of FIG. 2), a large force is exerted on the rear-side shaft 9 in an axially forward direction such that the rear-side shaft 9 is axially displaced toward the second tube 11 of the shaft 1 via the spline joint (i.e., female spline joint portion 13 and male spline joint portion 19).

As a result, as shown in FIG. 3, the female spline joint portion 13 axially slides on the male spline joint portion 19 and thus the inner peripheral surface of the second tube 11 axially slides along the outer peripheral surface of the rear-side shaft 9. This permits axial sliding movement of the front-side shaft 8 relative to the rear-side shaft 9 in a retracted direction such that the front-side shaft 8 and the rear-side shaft 9 are axially retracted each other.

At this time, as shown in FIG. 3, on one hand, the outer periphery of seal ring 16 is also pushed axially rightward (viewing FIG. 3) by the inside wall surface 15a of seal housing groove 15 due to the axially rightward movement of the front-side shaft 8. On the other hand, the inner periphery of seal ring 16 is displaced axially rightward along the outer peripheral seal surface 9b and the sliding surface 9c, while being kept in sliding-contact with the outer peripheral seal surface 9b and then kept in sliding-contact with the sliding surface 9c.

That is, as appreciated from comparison with the cross-sections of FIGS. 2-3, the seal ring 16 smoothly slides on both the outer peripheral seal surface 9b and the sliding surface 9c of the rear-side shaft 9, while axially moving away from the male spline joint portion 19. Hence, there is no risk that the seal ring 16 is jammed between the female spline joint portion 13 and the male spline joint portion 19.

As discussed above, when the front-side shaft 8 axially slides relative to the rear-side shaft 9, there is a less sliding resistance produced by the seal ring 16, thus suppressing an increase in undesired sliding resistance (an increase in undesired load). Thus, it is possible to sufficiently suppress an impact absorbing potential of the front-side shaft 8 having the female spline joint portion 13 (internal splines) and the rear-side shaft 9 having the male spline joint portion 19 (external splines) from lowering.

Conversely when excessive input loads are exerted on the front-side shaft 8 and/or the rear-side shaft 9 in an extended direction (see the two voided arrows of FIG. 4 directed in two opposite axial directions) such that the front-side shaft 8 and the rear-side shaft 9 are axially extended each other and displaced from the relative-position relation of the second tube 11 of the front-side shaft 8 to the rear-side shaft 9 as shown in FIG. 2, large forces act on the second tube 11 of the front-side shaft 8 and the rear-side shaft 9 in the extended direction such that the second tube 11 is axially displaced away from the rear-side shaft 9 via the spline joint (i.e., female spline joint portion 13 and male spline joint portion 19 spline-connected each other).

As a result, as shown in FIG. 4, the female spline joint portion 13 and the male spline joint portion 19 axially slide each other, and thus the inner peripheral surface of the second tube 11 axially slides along the outer peripheral surface of the rear-side shaft 9. This permits relative movement between the front-side shaft 8 and the rear-side shaft 9 in the extended direction such that the front-side shaft 8 and the rear-side shaft 9 are axially extended each other.

At this time, as shown in FIG. 4, the other sidewall surface (the right-hand sidewall, viewing FIG. 4) of seal rig 16 is pushed axially leftward (viewing FIG. 4) by the retainer part 20b of retainer member 20 due to relative displacements of the front-side shaft 8 and the rear-side shaft 9 in the two opposite axial directions (in the extended direction). Thus, the inner periphery of seal ring 16 is displaced axially leftward along the outer peripheral seal surface 9b of the rear-side shaft 9, while being kept in sliding-contact with the outer peripheral seal surface 9b. Thereafter, the inner periphery of seal ring 16 gets on the rightmost axial end of the male spline joint portion 19.

At the same time, the inside opening edge of the insertion through hole 20d of the retainer part 20b of retainer member 20 is brought into abutted-engagement with an inclined (tapered) face 18a formed at the edge portion of the rightmost axial end of the male-spline-joint formed part 18. That is, the inside diameter "R" of the insertion through hole 20d of retainer member 20 is dimensioned to be less than the diameter of an addendum circle of male spline joint portion 19. Hence, by virtue of abutment of the inclined face 18a of the rightmost axial end of male-spline-joint formed part 18 and the inside opening edge of insertion through hole 20d of retainer member 20, further relative displacements of the front-side shaft 8 and the rear-side shaft 9 in the extended direction can be suppressed or restricted. That is, by virtue of the difference diameter between inside diameter "R" of the insertion through hole 20d and the diameter of an addendum circle of male spline joint portion 19, it is possible to prevent the shaft 9 from falling out of the tubular shaft 8 during relative displacements of the two shafts 8-9 in the extended direction.

Therefore, in a similar manner to the retracted relative movement of the front-side shaft 8 and the rear-side shaft 9 explained previously in reference to FIGS. 2-3, in the case of the extended relative movement (see FIG. 4) of the two shafts 8-9 spline-connected each other, the seal ring 16 smoothly slides on the outer peripheral seal surface 9b of the rear-side shaft 9, while approaching the male spline joint portion 19. Also, during the last phase of extended relative movement (see FIG. 4) of the two shafts 8-9, by virtue of abutment of the inclined face 18a of male-spline-joint formed part 18 and the inside opening edge of insertion through hole 20d of retainer member 20, further relative displacements of the two shafts 8-9 in the extended direction can be restricted. Hence, there is no risk that the seal ring 16 is jammed between the female spline joint portion 13 and the male spline joint portion 19.

Therefore, in a similar manner to the retracted relative sliding movement (i.e., a transition from the state of FIG. 2 to the state of FIG. 3) of the two shafts 8-9, in the presence of the extended relative sliding movement (see FIG. 4) of the two shafts 8-9, there is a less sliding resistance produced by the seal ring 16, thus suppressing an increase in undesired sliding resistance (an increase in undesired load). Thus, it is possible to sufficiently suppress an impact absorbing potential of the front-side shaft 8 having the female spline joint portion 13 and the rear-side shaft 9 having the male spline joint portion 19 from lowering.

In contrast to the above, in the prior-art technology as disclosed in U.S. Pat. No. 6,186,687, a breakable pin (such as a shear pin) is interposed between the shaft member having the male spline joint portion and the tubular member having the female spline joint portion in a manner so as to restrict axial relative movement between the shaft member and the tubular member. In the prior-art impact-energy absorbing device utilizing such a breakable pin interposed between the shaft member and the tubular member, the breakable pin is designed and structured to absorb an impact by breaking of the breakable pin in the presence of application of an excessive input load exceeding a predetermined magnitude of force. However, in the case of application of an input load less than the predetermined magnitude of force, the breakable pin may rather obstruct a sufficient impact absorbing effect in the retracted relative movement as well as the extended relative movement of the shaft member and the tubular member.

In the case of the power transmission shaft of the shown embodiment, any breakable pin is not used. Thus, during application of an impact less than a predetermined magnitude of force as well as during application of an impact exceeding the predetermined magnitude of force, it is possible to sufficiently and smoothly absorb the impact mainly by virtue of stable relative sliding movement of the female spline joint portion 13 and the male spline joint portion 19 (that is, an appropriate axial sliding resistance of the spline joint 13 and 19) and smooth sliding motion of seal ring 16 (that is, a less sliding resistance of seal ring 16). Thus, it is possible to sufficiently suppress an impact absorbing potential of the two shafts 8-9 from lowering.

Also, during the last stage of extended relative movement (see FIG. 4) of the two shafts 8-9, the inside opening edge of the insertion through hole 20d of retainer member 20 is brought into abutted-engagement with the inclined face 18a of male-spline-joint formed part 18. At this time, that is, at the time when further relative displacements of the two shafts 8-9 in the extended direction are restricted by abutment (collision-contact) of the inclined face 18a of male-spline-joint formed part 18 and the inside opening edge of insertion through hole 20d, an impact load change tends to occur due to the collision contact. Under these conditions, when a further large force acts in the same direction (i.e., in the extended direction), the outer cylinder part 20a of retainer member 20 axially falls out of the press-fit cylindrical surface 17 of the second tube 11. This permits relative displacements of the two shafts 8-9 in the extended direction, and thus the impact load can be further absorbed.

Furthermore, retainer member 20 is press-fitted onto the rear end of the second tube 11 of the front-side shaft 8 and configured to retain the seal ring 16 in a manner so as to cover the other sidewall surface (the right-hand sidewall) of seal ring 16. This enhances the ability to retain the seal ring 16. Thus, it is possible to sufficiently prevent entry of foreign matters such as soil dust and/or muddy water, splashed by front road wheels, between the female spline joint portion 13 (internal splines) and the male spline joint portion 19 (external splines).

In particular, the power transmission shaft of the shown embodiment does not use any rubber-boot-and-boot-band to be installed or fitted to cover the circumference of the spline-connected section of the rear end of the second tube 11 of the front-side shaft 8 and the front end of the rear-side shaft 9 as a seal around the spline-connected section. Instead of using a rubber boot and boot bands, the seal ring 16, which is fitted and retained in the seal housing groove 15 formed in the cylindrical inner peripheral surface 14 of the second tube 11 of the front-side shaft 8, is structured to provide a mechanical seal for the two rotating shafts 8-9. This contributes to the reduced diameter of the power transmission shaft.

Additionally, the previously-discussed mechanical seal structure (seal ring 16) eliminates the need for a plurality of boot bands. This contributes to the reduced number of parts, that is, lower time and costs of the power transmission shaft.

Furthermore, retainer part 20b is configured to cover the annular chamfered opening 15b of seal housing groove 15. Hence, it is possible to stably and reliably retain the seal ring 16 between the inside end face 20c of retainer member 20 and the inside wall surface 15a of seal housing groove 15 cooperating with each other. Therefore, it is possible to maintain and ensure a favorable sealing performance of the seal ring 16 and simultaneously improve the durability of the mechanical seal structure.

By the way, retainer member 20 is configured such that the retainer part 20b is axially displaced without sliding-contact of the cylindrical inner peripheral surface of the insertion through hole 20d of retainer part 20b with the outer peripheral surfaces of the rear-side shaft 9 (i.e., outer peripheral seal surface 9b and sliding surface 9c), during relative movement of the front-side shaft 8 to the rear-side shaft 9 in the retracted direction. Hence, there is no sliding resistance produced by the retainer member 20.

Second Embodiment

Figure 5:
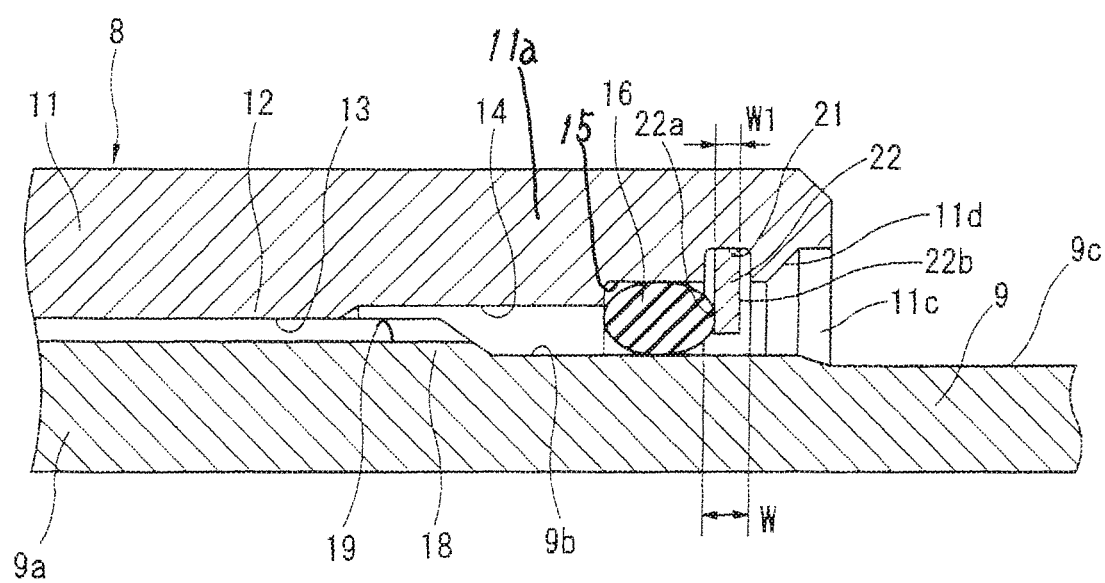
FIG. 5 is an enlarged view in partial longitudinal cross-section illustrating the essential part of a vehicle propeller shaft of the second embodiment.

Referring to FIG. 5, there is shown the power transmission shaft (the vehicle propeller shaft) of the second embodiment. Seal housing groove 15 is formed in the distal part of the cylindrical inner peripheral surface 14 at an axial position somewhat spaced apart from the rearmost end face of the rear end 11a of the second tube 11. Additionally, a diametrically-enlarged retainer housing annularly recessed groove (simply, retainer housing groove) 21 is formed axially outside of the seal housing groove 15, such that these grooves 15 and 21 are juxtaposed to each other. A diametrically-expanding/contracting, elastically deformable snap-action retainer member 22 is held in the retainer housing groove 21.

The rear-half inner peripheral surface (the right-hand side inner peripheral surface, viewing FIG. 5) of the opening 11c of the rear end 11a of the second tube 11 is configured as an annular surface having a uniform inside diameter. On the other hand, the front-half inner peripheral surface 11d (the left-hand side inner peripheral surface, viewing FIG. 5) of rear end opening 11c, juxtaposed to and arranged inside of the annular surface, is configured as a tapered surface whose inside diameter gradually reduces from the annular surface to the retainer housing groove 21.

Retainer housing groove 21 is configured and arranged continuously on the right-hand side of the seal housing groove 15. The inside diameter of retainer housing groove 21 is dimensioned to be greater than that of seal housing groove 15. The axial width (axial length) "W" of retainer housing groove 21 is dimensioned to be greater than the axial width "W1" of retainer member 22.

Retainer member 22 is made of a metal material having a spring force and formed into a substantially annular shape. The annular retainer member 22 has a cutout formed at a given circumferential position. For instance, the cutout of retainer member 22 is formed and configured as circumferentially-opposed, two inclined cut surfaces, so as to permit the annular retainer member 22 to be elastically deformed diametrically. In a diametrically-enlarged state of retainer member 22, the inside diameter of retainer member 22 is set or dimensioned to be greater than the outside diameter of the outer peripheral seal surface 9b of the rear-side shaft 9.

As clearly shown in FIG. 5, also, in a specific state where retainer member 22 is elastically deformed and snapped back into the retainer housing groove 21, one axial sidewall surface 22a (hereinafter referred to as "annular inside face") of retainer member 22, facing axially forward, is brought into abutted-engagement with the other sidewall surface of seal ring 16. Hence, seal ring 16 is retained or sandwiched between the inside wall surface 15a of seal housing groove 15 and the one axial sidewall surface 22a of retainer member 22.

Concretely, when accommodating or placing the retainer member 2 into the retainer housing groove 21, first of all, seal ring 16 is placed and held into the seal housing groove 15 in advance. Under this condition, retainer member 22 is axially inserted and fitted into the annular surface of the rear end opening 11c of the second tube 11, while grasping the retainer member. Thereafter, when axially pushing the other axial sidewall surface 22b of retainer member 22 toward the retainer housing groove 21, retainer member 22 is pushed axially inward (axially forward, viewing FIG. 5), while the outer peripheral edge of the one axial sidewall surface 22a is kept in sliding-contact with the tapered inner peripheral surface 11d. Hence, retainer member 22 moves axially leftward, while diametrically deforming with contraction against an elastic force of the diametrically-enlarged direction of retainer member 22. Immediately when retainer 22 is fitted into the retainer housing groove 21, retainer member 22 is elastically deformed and diametrically deformed by its elastic return force such that the outer peripheral surface of retainer member 22 is brought into elastic-contact with the groove bottom surface of retainer housing groove 21. At this time, the one axial sidewall surface 22a of the annular retainer member 22 is brought into abutted-engagement with the other sidewall surface of seal ring 16, in a manner so as to retain the seal ring 16 in cooperation with the inside wall surface 15a of seal housing groove 15.

As discussed above, the power transmission shaft of the second embodiment can provide the same operation and effects as the first embodiment. In particular, in the second embodiment of FIG. 5, retainer member 22 is held in the retainer housing groove 21 formed on the inner peripheral side of the rear end 11a of the second tube 11. Thus, in a similar manner to the first embodiment, the outside diameter of the power transmission shaft of the second embodiment can be reduced, and also the number of parts can be reduced.

Additionally, retainer member 22 can be easily fitted and held into the retainer housing groove 21 with snap-action (with single operation). Hence, as compared with the power transmission shaft of the first embodiment that requires press-fitting of retainer member 20 onto the press-fit cylindrical surface 17 of the rear end 11a and radially inward bending of retainer part 20b of retainer member 20 after press-fitting, the power transmission shaft of the second embodiment facilitates the assembling work.

Additionally, such a combination of the elastically deformable snap-action retainer member 22 and the annular retainer housing groove 21 enhances the positioning accuracy of the retainer member 22 fitted to the inner peripheral side of the rear end 11a of the second tube 11.

Third Embodiment

Figure 6:
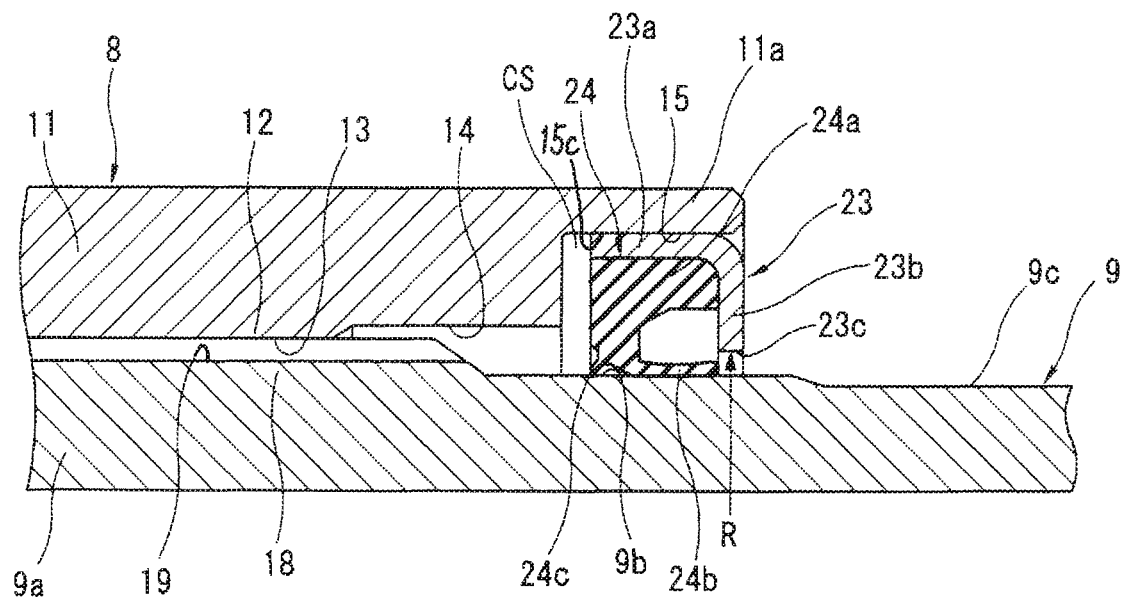
FIG. 6 is an enlarged view in partial longitudinal cross-section illustrating the essential part of a vehicle propeller shaft of the third embodiment.

Referring to FIG. 6, there is shown the power transmission shaft (the vehicle propeller shaft) of the third embodiment. A seal member 24 and a retainer member 23 are united with each other. That is, seal member 24 and retainer member 23 are formed integral with each other and configured as a so-called oil-seal structure.

That is, seal housing groove 15 is formed in the cylindrical inner peripheral surface of the rearmost end portion of the rear end 11a of the second tube 11 and configured as an annular surface having a uniform inside diameter.

As shown in FIG. 6, retainer member 23 is formed and bent into a substantially C-shape in cross-section. Retainer member 23 is comprised of an outer cylinder part 23a press-fitted into the inner peripheral surface of seal housing groove 15 and a retainer part 23b bent to extend in the direction perpendicular to the axial direction of the second tube 11. The outside diameter of outer cylinder part 23a is dimensioned to be slightly greater than the inside diameter of the inner peripheral surface of seal housing groove 15, thereby ensuring a press-fit margin.

On the other hand, retainer part 23b has a central insertion through hole 23c formed in the center of retainer part 23b. The inside diameter "R" of the central insertion through hole 23c is dimensioned to be substantially equal to the outside diameter "R1" of the male-spline-joint formed part 18 of the rear-side shaft 9.

Seal member 24 is formed into a substantially inverted C-shape in cross-section. The outer peripheral portion 24a of seal member 24 is bonded to the inner peripheral wall surfaces of outer cylinder part 23a and retainer part 23b by vulcanization bonding. The inner peripheral surface of the inner peripheral portion 24b and the seal lip 24c of seal member 24 are configured to abut on the outer peripheral seal surface 9b of the rear-side shaft 9.

By the way, an annular clearance space "CS" is defined between the inside wall surface 15a of seal housing groove 15 and the front end faces of retainer member 23 and seal member 24, axially facing the inside wall surface 15a, for preventing undesired interference between them when press-fitting the retainer member 23.

With the previously-discussed arrangement, the power transmission shaft of the third embodiment can provide the same operation and effects of the first embodiment. In particular, in the third embodiment of FIG. 6, retainer member 23 together with seal member 24 is held in the seal housing groove 15. Thus, the outside diameter of the power transmission shaft of the third embodiment can be further reduced.

Additionally, retainer member 23 and seal member 24 are united with each other, thus reducing the number of parts. This contributes to the lower time and costs of the power transmission shaft. The oil-seal structural body, in which retainer member 23 and seal member 24 are united with each other, can be easily fitted and held into the seal housing groove 15 with single operation. Hence, the power transmission shaft of the third embodiment facilitates the assembling work.

Fourth Embodiment

Figure 7:
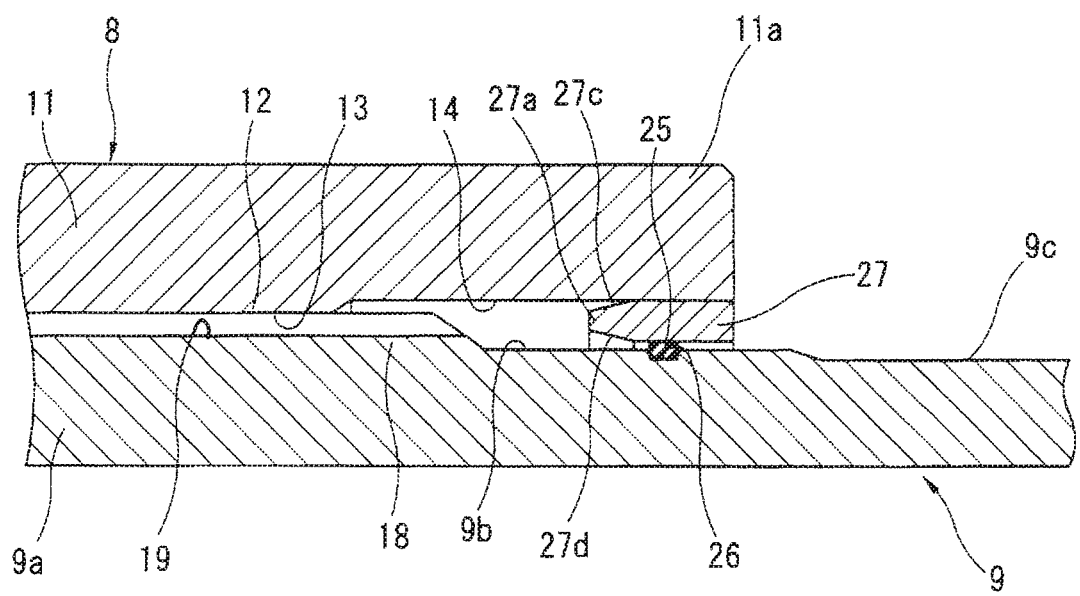
FIG. 7 is an enlarged view in partial longitudinal cross-section illustrating the essential part of a vehicle propeller shaft of the fourth embodiment.
Figure 8:
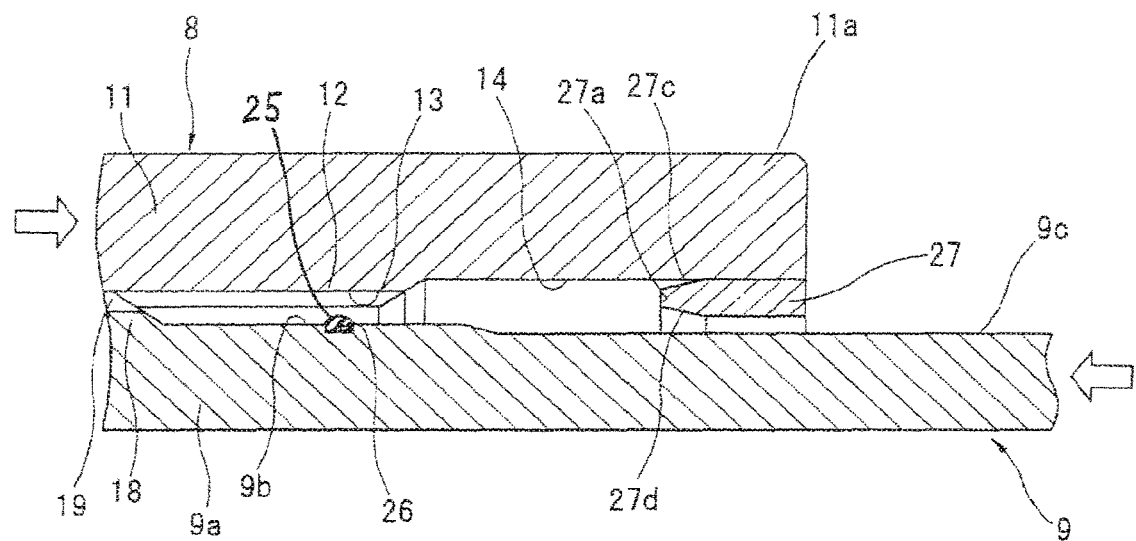
FIG. 8 is an enlarged view in partial longitudinal cross-section illustrating the relative position relation between the front-side shaft member and the rear-side shaft member in a retracted state in the vehicle propeller shaft of the fourth embodiment.

Referring to FIGS. 7-8, there is shown the power transmission shaft (the vehicle propeller shaft) of the fourth embodiment. An annular seal housing groove 26 is formed in the outer peripheral seal surface 9b of the rear-side shaft 9 at a substantially center axial position of the outer peripheral seal surface 9b. A seal member 25 is fitted into the seal housing groove 26. A retainer member 27 is press-fitted to the cylindrical inner peripheral surface 14 (having a uniform inside diameter) of the rear end 11a of the second tube 11.

The rear end portion of retainer member 27 is formed into a cylindrical-hollow shape, whereas the front end portion 27a of retainer member 27 is formed as a chamfered portion. The front chamfered end portion 27a has a tapered outer peripheral surface 27c and a tapered inner peripheral surface 27d. Under a press-fitted state of retainer member 27 into the cylindrical inner peripheral surface 14, the outer periphery of seal ring 25 is kept in press-contact with the inner peripheral surface of retainer member 27. Thus, seal ring 25 is compressively deformed between the groove bottom surface of seal housing groove 26 and the inner peripheral surface of retainer member 27.

Therefore, when assembling the respective component parts, first of all, seal ring 25 is fitted and held into the seal housing groove 26. Under this condition, the rear-side shaft 9 is inserted into the second tube 11 via the spline joint (i.e., female spline joint portion 13 and male spline joint portion 19 spline-connected each other) and displaced to a predetermined axial position.

Thereafter, when press-fitting the front chamfered end portion 27a of retainer member 27 to the cylindrical inner peripheral surface 14, retainer member 27 smoothly moves axially forward without undesired interference between the front chamfered end portion 27a and the inside opening edge of the opening of the rear end 11a by virtue of the tapered outer peripheral surface 27c. Simultaneously, retainer member 27 smoothly moves axially forward without undesired interference between the chamfered end portion 27a and the outer periphery of seal ring 25 by virtue of the tapered inner peripheral surface 27d. In this manner, retainer member 27 can be smoothly press-fitted and displaced to the predetermined axial position shown in FIG. 7.

Hence, the assembling work of retainer member 27 can be easily completed. Additionally, seal ring 25 can be retained in the seal housing groove 26 with a proper compressive force. This ensures a favorable sealing performance.

When excessive input loads are exerted on the front-side shaft 8 and/or the rear-side shaft 9 in a retracted direction (see the two voided arrows of FIG. 8 directed in two opposite axial directions) such that the front-side shaft 8 and the rear-side shaft 9 are axially retracted each other, that is, in the presence of the retracted relative sliding movement (i.e., a transition from the state of FIG. 7 to the state of FIG. 8) of the two shafts 8-9, retainer member 27, together with the front-side shaft 8, merely slides smoothly on the outer periphery of seal ring 25, while axially sliding away from the male spline joint portion 19. Thus, it is possible to more sufficiently suppress an impact absorbing potential of the two shafts 8-9 from lowering.

In the power transmission shaft structure of the fourth embodiment, the outside diameter of seal ring 25 and the outside diameter of retainer member 27 can be reduced as much as possible. This contributes to the reduced diameter of the power transmission shaft.

In particular, seal ring 25 can be configured to have a comparatively reduced cross-sectional area, thus reducing the manufacturing costs.

Additionally, the cross-sectional structure of retainer member 27 is simple, that is, a substantially cylindrical-hollow shape. The simplified structure of retainer member 27 contributes to easy machining.

Fifth Embodiment

Figure 9:
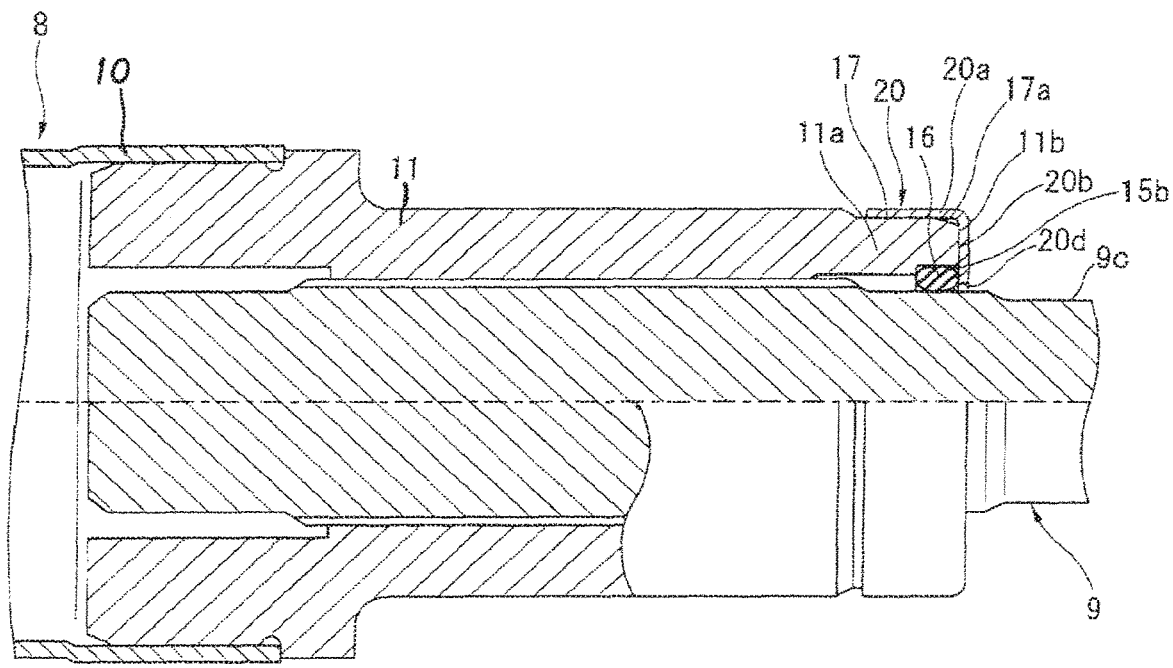
FIG. 9 is an enlarged view in partial longitudinal cross-section illustrating the essential part of a vehicle propeller shaft of the fifth embodiment.

Referring to FIG. 9, there is shown the power transmission shaft (the vehicle propeller shaft) of the fifth embodiment. The basic structure of the power transmission shaft of the fifth embodiment is similar to the first embodiment. The fifth embodiment differs from the first embodiment as follows. That is, the rear-side shaft 9 of the first embodiment is formed as a cylindrical-hollow tubular member, whereas the rear-side shaft 9 of the fifth embodiment is formed as a solid shaft. The other configuration/structure of the fifth embodiment is similar to the first embodiment. Thus, the power transmission shaft of the fifth embodiment can provide the same operation and effects as the first embodiment.

Sixth Embodiment

Figure 10:
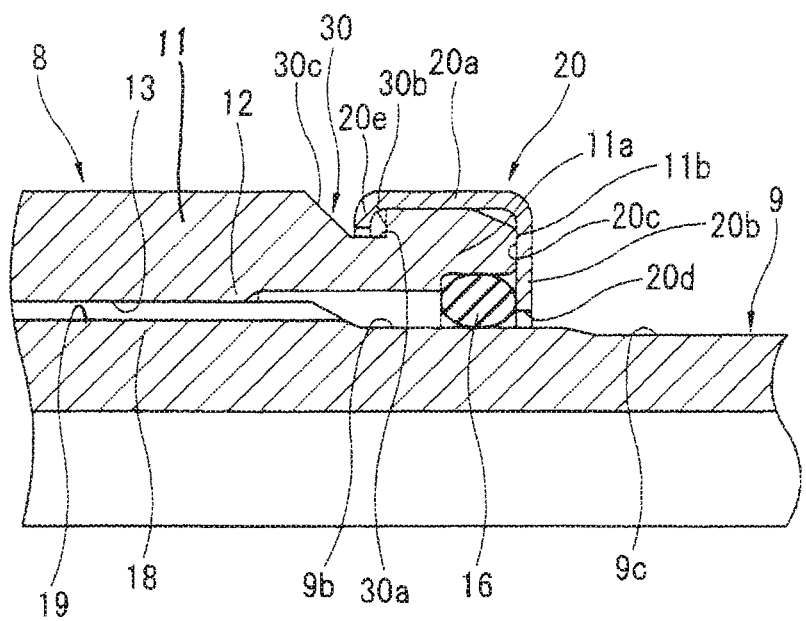
FIG. 10 is an enlarged view in partial longitudinal cross-section illustrating the essential part of a vehicle propeller shaft of the sixth embodiment.
Figure 11:
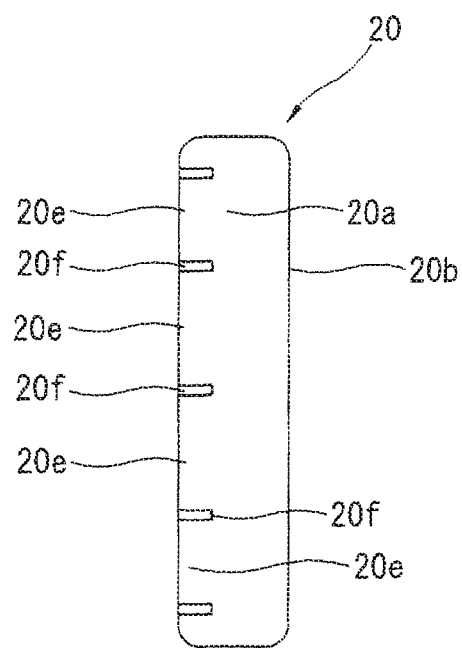
FIG. 11 is a side view illustrating a retainer member used for the vehicle propeller shaft of the sixth embodiment.

Referring to FIGS. 10-11, there is shown the power transmission shaft (the vehicle propeller shaft) of the sixth embodiment. The basic structure of the power transmission shaft of the sixth embodiment is similar to the first embodiment. The sixth embodiment mainly differs from the first embodiment, in that the shape of retainer member 20 of the sixth embodiment is somewhat modified.

That is, an annular engaged groove 30 is formed in the outer peripheral surface of the rear end 11a of the second tube 11. Annular engaged groove 30 is formed into a substantially rectangular shape in cross section. A rear-end wall surface 30b of engaged groove 30, rising from the rearmost end of a groove bottom surface 30a, is formed as an annular perpendicular surface extending in the direction perpendicular to the axial direction of the second tube 11. In contrast, a front-end wall surface 30c of engaged groove 30, rising from the foremost end of the groove bottom surface 30a, is formed as an axially-forward inclined tapered surface serving as a flank surface (a clearance surface).

On the other hand, retainer member 20 of the sixth embodiment is made of an iron-based metal plate and formed and bent into a substantially C-shape in cross-section by pressing in a similar manner to the first embodiment. Retainer member 20 is comprised of the outer cylinder part 20a and the disk-shaped retainer part 20b bent to extend in the direction perpendicular to the axial direction of the second tube 11. In the sixth embodiment, the front end of the outer cylinder part 20a is formed integral with a plurality of engaging lugs 20e. When assembling, engaging lugs 20e are brought into engagement with the engaged groove 30.

As seen from FIG. 11, engaging lugs 20e are separated from each other via a plurality of circumferentially equidistant spaced slots 20f. After retainer member 20 has been fitted onto the rear end 11a of the second tube 11 of the front-side shaft 8 axially forward, these engaging lugs 20e of the front end of the outer cylinder part 20a are deformed and bent radially inward by pressure, such that the engaging lugs 20e are brought into fitted-engagement with the outer circumferential edge of the rear-end wall surface 30b of engaged groove 30. In this manner, retainer member 20 is fixedly connected onto the rearmost end of the second tube 11 by fitted-engagement of engaging lugs 20e and engaged groove 30.

Therefore, in the sixth embodiment, when fixing retainer member 20 onto the rear end 11a of the second tube 11, first of all, the outer cylinder part 20a with the axially-straight engaging lugs 20e not yet bent is loosely fitted onto the outer periphery of the rear end 11a without press-fitting the outer cylinder part 20a onto the outer periphery of the rear end 11a. Thereafter, the engaging lugs 20e of the front end of the outer cylinder part 20a are deformed and bent radially inward by pressure and caulked. In this manner, retainer member 20 is securely engaged with the outer circumferential edge of the rear-end wall surface 30b of engaged groove 30.

Hence, retainer member 20 can be more securely fixed onto the rear end 11a of the second tube 11.

When bending each of engaging lugs 20e radially inward, the front-end wall surface 30c of engaged groove 30 functions as a flank surface (a clearance surface). This facilitates the bending work (caulking work).

The other configuration/structure of the sixth embodiment is similar to the first embodiment. Thus, the power transmission shaft of the sixth embodiment can provide the same operation and effects as the first embodiment.

Seventh Embodiment

Figure 12:
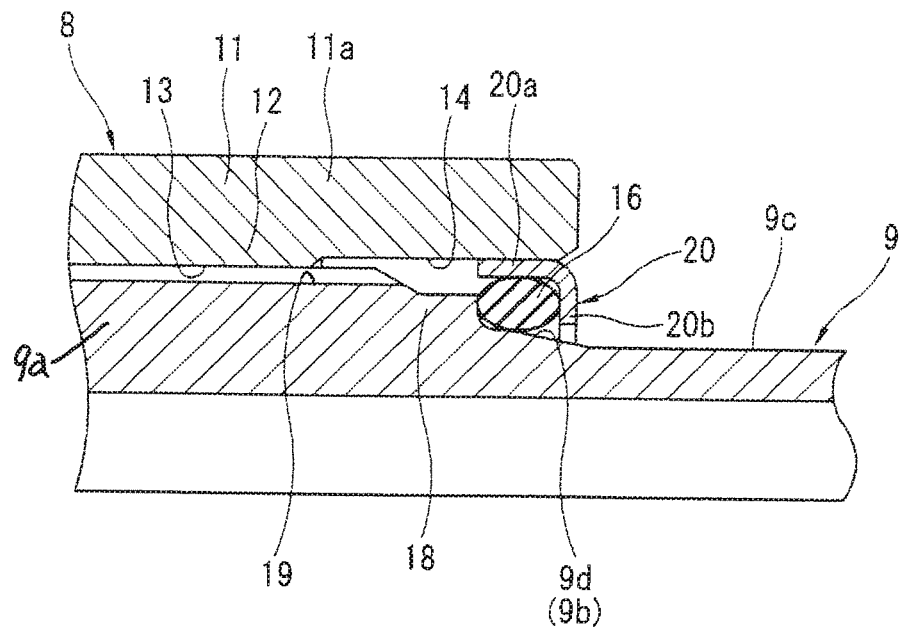
FIG. 12 is an enlarged view in partial longitudinal cross-section illustrating the essential part of a vehicle propeller shaft of the seventh embodiment.
Figure 13:
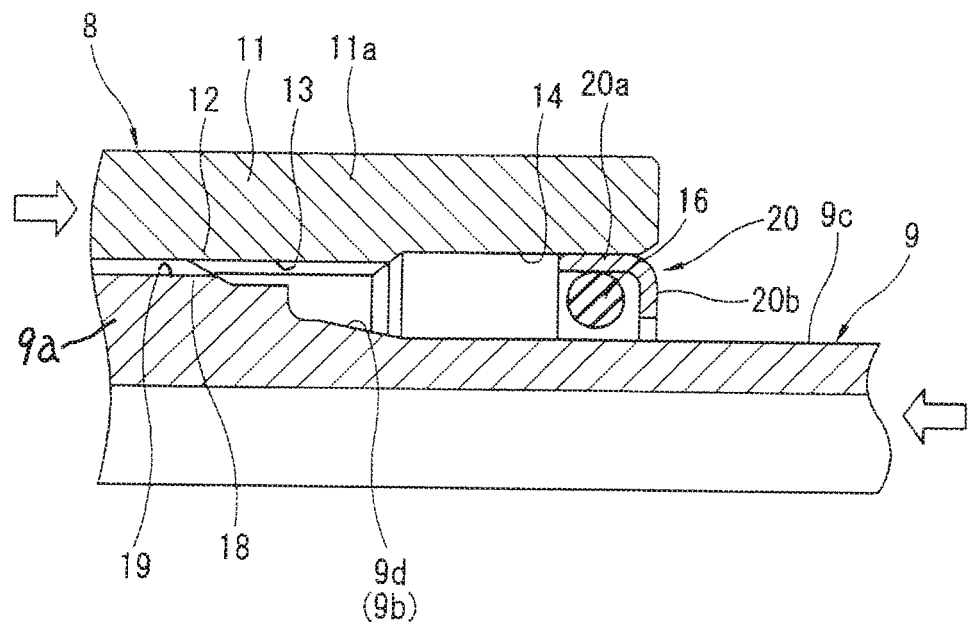
FIG. 13 is an enlarged view in partial longitudinal cross-section illustrating the relative position relation between the front-side shaft member and the rear-side shaft member in a retracted state in a vehicle propeller shaft of the seventh embodiment.

Referring to FIGS. 12-13, there is shown the power transmission shaft (the vehicle propeller shaft) of the seventh embodiment. As shown in FIG. 12, the outer peripheral seal surface 9b of the rear-side shaft 9 is formed and configured as a moderate inclined surface 9d, which is positioned near the outer circumferential edge of the rightmost axial end of the male-spline-joint formed part 18, and whose outside diameter gradually moderately reduces from the outer circumferential edge of the rightmost axial end of the male-spline-joint formed part 18 to the sliding surface 9c.

In a similar manner to the first embodiment, retainer member 20 of the seventh embodiment is formed and bent into a substantially C-shape in cross-section by pressing. Retainer member 20 is comprised of the outer cylinder part 20a and the disk-shaped retainer part 20b. The outer peripheral surface of the outer cylinder part 20a is press-fitted to the cylindrical inner peripheral surface 14 formed in the inner periphery of the rear end 11a of the second tube 11. In the seventh embodiment, in cooperation with the retainer 20, the cylindrical inner peripheral surface 14 serves as a somewhat diametrically-enlarged seal housing annular groove.

Regarding the seal ring 16 serving as a seal member, under a normal assembled state where the front end 9a of the rear-side shaft 9 has been axially inserted into the second tube 11 by a prescribed amount and thus female spline joint portion 13 and male spline joint portion 19 are satisfactorily spline-connected each other, the outer peripheral portion of seal ring 16 is kept in elastic-contact with the inner peripheral side of retainer member 20. On the other hand, the inner peripheral portion of seal ring 16 is kept in elastic-contact with the moderate inclined surface 9d of the outer peripheral seal surface 9b of the rear-side shaft 9 with a compressive deformation.

Therefore, the power transmission shaft of the seventh embodiment can provide the same operation and effects as the first embodiment. In particular, by virtue of the reduced outside diameter of retainer member 20, the outside diameter of the power transmission shaft of the seventh embodiment can be further reduced.

When excessive input loads are exerted on the front-side shaft 8 and/or the rear-side shaft 9 in a retracted direction (see the two voided arrows of FIG. 13 directed in two opposite axial directions) such that the front-side shaft 8 and the rear-side shaft 9 are axially retracted each other, that is, in the presence of the retracted relative sliding movement (i.e., a transition from the state of FIG. 12 to the state of FIG. 13) of the two shafts 8-9, the inner peripheral portion of seal ring 16 axially slides on the moderate inclined surface 9d toward the sliding surface 9c. As a result, the inner periphery of seal ring 16 is brought into a spaced, contact-free relationship with the outer peripheral seal surface 9b (i.e., the inclined surface 9d).

Hence, a sliding resistance, caused by seal ring 16, can be sufficiently reduced, thereby ensuring a more preferable impact absorbing effect.

Eighth Embodiment

Figure 14:
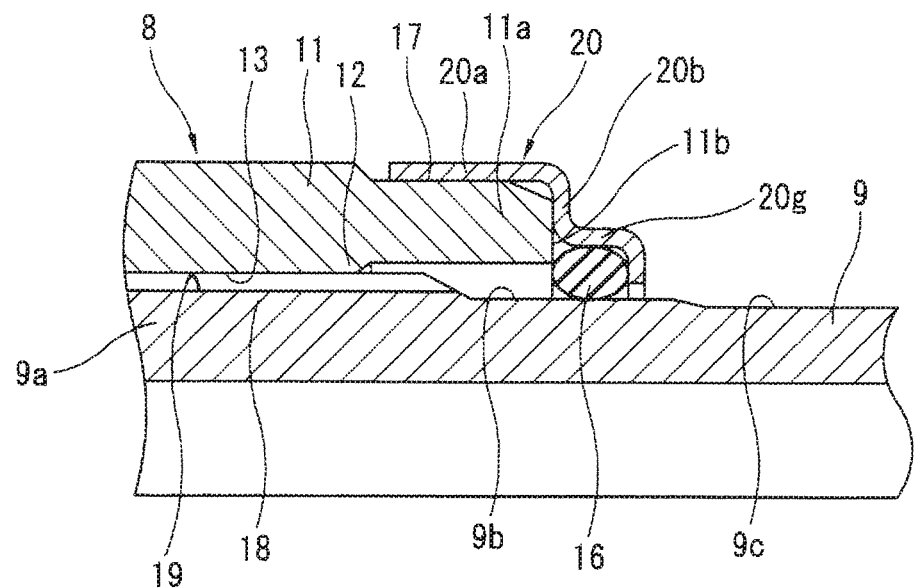
FIG. 14 is an enlarged view in partial longitudinal cross-section illustrating the essential part of a vehicle propeller shaft of the eighth embodiment.

Referring to FIG. 14, there is shown the power transmission shaft (the vehicle propeller shaft) of the eighth embodiment. The basic structure of the power transmission shaft of the eighth embodiment is similar to the first embodiment. The eighth embodiment mainly differs from the first embodiment, in that the cross-section of the retainer part 20b of retainer member 20 is somewhat modified. That is, the inner peripheral portion of the retainer part 20b is partly configured as an axially-backward expanded portion 20g. Seal ring 16 is housed and retained in the expanded portion 20g.

Retainer 20 is comprised of the outer cylinder part 20a and the retainer part 20b, both integrally formed by pressing. The outer cylinder part 20a is press-fitted onto the press-fit cylindrical surface 17 of the rear end 11a of the second tube 11. The retainer part 20b is configured as an annular retainer part bent at a substantially axially central position of the outer cylinder part 20a in the direction perpendicular to the axial direction of the second tube 11.

Regarding the retainer part 20b, the previously-noted inner peripheral expanded portion 20g is bent and formed into a stepped small-diameter portion. Seal ring 16 is retained and sandwiched between the inner peripheral wall of expanded portion 20g and the rearmost end face 11b of the second tube 11.

As appreciated from comparison between the cross-section of FIG. 2 of the first embodiment and the cross-section of FIG. 14 of the eighth embodiment, the diameter of seal ring 16 of the eighth embodiment is dimensioned to be less than that of the first embodiment. The inner peripheral portion of seal ring 16 is kept in elastic-contact with the outer peripheral seal surface 9b of the rear-side shaft 9 with a compressive deformation.

Therefore, the power transmission shaft of the eighth embodiment can provide the same operation and effects as the first embodiment. In particular, the expanded portion 20g, which serves as a seal ring housing, can be easily formed by pressing. By means of the retainer member 20 having such a stepped cross-section (i.e., the seal-ring housing expanded portion 20g), seal ring 16 is retained directly in the retainer member 20. This eliminates the need for a seal housing groove cut and machined in the inner peripheral surface of the rear end 11a.

For the reasons discussed above, the seal/retainer structure of the eighth embodiment ensures a more easy manufacturing work, thus reducing the manufacturing costs.

Ninth Embodiment

Figure 15:
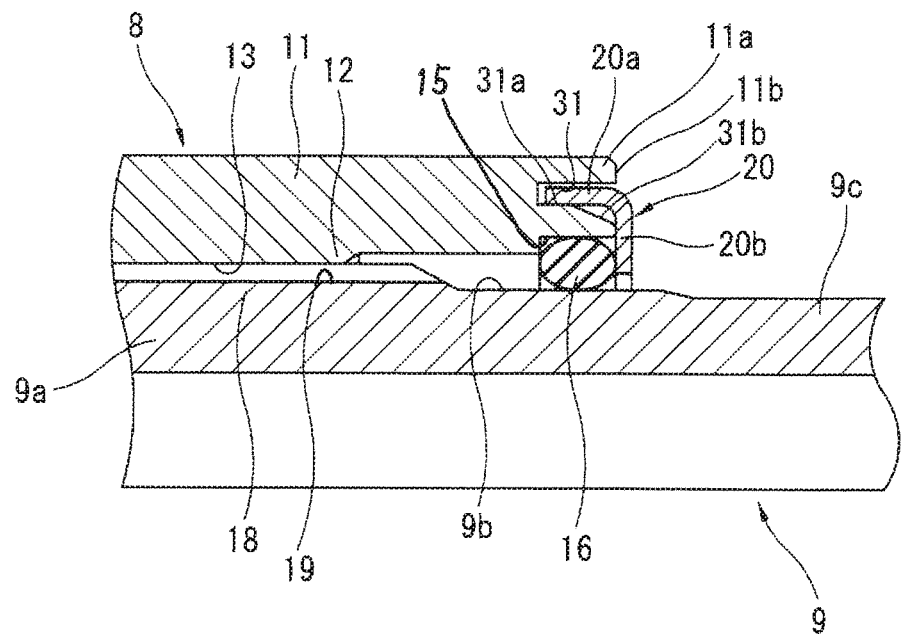
FIG. 15 is an enlarged view in partial longitudinal cross-section illustrating the essential part of a vehicle propeller shaft of the ninth embodiment.

Referring to FIG. 15, there is shown the power transmission shaft (the vehicle propeller shaft) of the ninth embodiment. The basic structure of the power transmission shaft of the ninth embodiment is similar to the first embodiment. The ninth embodiment mainly differs from the first embodiment, in that a cylindrical press-fit groove 31 is cut and formed in the rearmost end face 11b of the second tube 11. The axial depth of press-fit groove 31 is dimensioned to be slightly greater than the axial length of the outer cylinder part 20a of retainer member 20 so as to permit axial movement of the outer cylinder part 20a into engagement with the press-fit groove 31. The distal end of the radially inward cylindrical wall surface 31a of press-fit groove 31 is partially machined or chamfered as a tapered surface 31b (a beveled edge) whose outside diameter gradually reduces axially backward (i.e., toward the opening end of press-fit groove 31). The tapered surface 31b functions as a guide surface for press-fitting the retainer member 20.

As appreciated from comparison between the cross-section of FIG. 2 of the first embodiment and the cross-section of FIG. 15 of the ninth embodiment, the outside diameter of the outer cylinder part 20a of retainer member 20 of the ninth embodiment is dimensioned to be less than that of the first embodiment. When deeply press-fitting the outer cylinder part 20a into the press-fit groove 31 axially forward, while being guided by the tapered surface 31b, the inner peripheral surface of the outer cylinder part 20a is press-fitted onto the cylindrical wall surface 31a positioned axially forward relative to the tapered surface 31b. In this manner, the retainer member 20 can be stably housed and held in the press-fit groove 31.

In a similar manner to the first embodiment, seal ring 16 of the ninth embodiment, serving as a seal member, is also fitted and retained in the seal housing groove 15, such that the seal ring 16 is sandwiched between the inside end face of retainer part 20b and the inside wall surface 15a of seal housing groove 15. Concretely, seal ring 16 is retained between the inner peripheral surface of the seal housing groove 15 and the outer peripheral seal surface 9b of the rear-side shaft 9 with a compressive deformation.

Therefore, the power transmission shaft of the ninth embodiment can provide the same operation and effects as the first embodiment. In particular, by virtue of the further reduced outside diameter of retainer member 20, the outside diameter of the power transmission shaft of the ninth embodiment can be further reduced, as compared to the first embodiment.

In the shown embodiments, the rear end 11a of the tubular front-side shaft 8 is arranged to face toward the rear side of a vehicle when the tubular front-side shaft 8 together with the rear-side shaft 9 is installed on the vehicle. Thus, it is possible to prevent entry of foreign matters such as soil dust and/or muddy water, splashed by front road wheels, between the female spline joint portion (internal splines) and the male spline joint portion 19 (external splines). Furthermore, in the shown embodiments, the engagement device (i.e., the male-spline-joint section 18-19 and the female-spline-joint section 12-13) belonging to the rear-side shaft 9 includes the male spline joint portion 19. The rear-side shaft 9 is formed with the male-spline-joint formed part 18 on which the male spline joint portion 19 is formed, and the non-splined section 9b formed from the male-spline-joint formed part 18 toward the rear end side of the rear-side shaft 9 facing the axially rearward direction. The inside diameter R of the insertion through hole 20d is dimensioned to be greater than at least the outside diameter of the non-splined section 9b. This ensures smooth relative displacements of the two shafts 8-9, during axial sliding movement of the front-side shaft 8 relative to the rear-side shaft 9 in the retracted direction such that the two shafts 8-9 are axially retracted each other.

The entire contents of Japanese Patent Application No. 2015-055776 (filed Mar. 19, 2015) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims. In the shown embodiments, the power-transmission shaft is exemplified in a vehicle proper shaft. In lieu thereof, the inventive concept can be applied to a propeller shaft for use in vessels. Also, the size (e.g., the depth) of the seal housing groove and the sectional shape (the outer diameter dimension) of the seal ring can be determined appropriately depending on the application object of a power transmission shaft and/or the outside diameter dimension of a power transmission shaft.

What is claimed is:

1. A propeller shaft comprising:
   a first shaft member having a male spline joint portion, a first diameter portion, and a second diameter portion which are formed on an outer peripheral surface of the first shaft member, and which are positioned axially in order of the male spline joint portion, the first diameter portion and the second diameter portion from a first end side of the first shaft member facing a first axial direction of two opposite axial directions,
   the first diameter portion having an outside diameter smaller than an outside diameter of a male-spline-joint formed part on which the male spline joint portion is formed, and
   the second diameter portion having an outside diameter smaller than the outside diameter of the first diameter portion;
   a second shaft member into which a portion of the first shaft member is inserted from the male spline joint portion and which has a seal member housing and a female spline joint portion that are positioned axially in order of the seal member housing and the female spline joint portion from an end portion of the second shaft member facing a second axial direction opposite to the first axial direction, the female spline joint portion formed on an inner peripheral surface of the second shaft member, the female spline joint portion being spline-connected to the male spline joint portion by inserting the male spline joint portion of the first shaft member from an end side of the second shaft member so as to permit axial sliding movement of the second shaft member relative to the first shaft member;
   the seal member housing formed at a position to confront the first diameter portion in a radial direction as a diametrically-enlarged portion whose inside diameter is greater than a diameter of a dedendum circle of the female spline joint portion;
   a seal member that is received between the seal member housing and the first diameter portion, and configured to prevent entry of foreign matter from an outside into a spline-connected section of the female spline joint portion and the male spline joint portion; and
   a retainer fixedly connected to the end side of the second shaft member so as to define a first wall of the seal member housing,
   wherein the seal member is held in a compressed state between the seal member housing and the first diameter portion, and
   wherein the seal member is positioned in a manner so as to be at an axial position of the second diameter portion of the first shaft member when the second shaft member slides relative to the first shaft member in the second axial direction via the female spline joint portion and the male spline joint portion which are spline-connected to each other.

2. The propeller shaft as recited in claim 1, wherein:
   the seal member housing is formed of the first wall of the retainer, an inner peripheral surface of the diametrically-enlarged portion, and a second wall of the diametrically-enlarged portion axially facing the first wall.

3. The propeller shaft as recited in claim 1, wherein:
the first shaft member is formed with the male-spline-joint formed part on which the male spline joint portion is formed, and an outer peripheral seal surface formed from the male-spline-joint formed part toward a second end side of the first shaft member facing the second axial direction, and configured to be kept in abutted-engagement with the seal member.

4. The propeller shaft as recited in claim 3, wherein:
the retainer is formed with an insertion through hole into which the first shaft member is inserted; and
an inside diameter of the insertion through hole is dimensioned to be greater than at least an outside diameter of the outer peripheral seal surface.

5. The propeller shaft as recited in claim 1, wherein:
the seal member and the retainer are formed integral with each other as a single seal structural body; and
the single seal structural body is housed in the seal member housing.

6. The propeller shaft as recited in claim 1, wherein:
the retainer is brought into abutted-engagement with the male-spline-joint formed part of the first shaft member on which the male spline joint portion is formed, when the second shaft member slides relative to the first shaft member in the first axial direction via the female spline joint portion and the male spline joint portion spline-connected to each other.

7. The propeller shaft as recited in claim 1, wherein:
the end side of the second shaft member is arranged to face toward a rear side of a vehicle when the second shaft member is installed on the vehicle.

8. A propeller shaft comprising:
a shaft member having a male spline joint portion, a first diameter portion, and a second diameter portion which are formed on an outer peripheral surface of the shaft member, and which are positioned axially in order of the male spline joint portion, the first diameter portion and the second diameter portion from a first end side of the shaft member facing a first axial direction of two opposite axial directions,
the first diameter portion having an outside diameter smaller than an outside diameter of a male-spline-joint formed part on which the male spline joint portion is formed, and
the second diameter portion having an outside diameter smaller than the outside diameter of the first diameter portion;
a tubular member into which a portion of the shaft member is inserted from the male spline joint portion to the first diameter portion, and which has a seal member housing and a female spline joint portion that are positioned axially in order of the seal member and the female spline joint portion in the axial direction from an end portion of the tubular member facing a second axial direction opposite to the first axial direction,
the female spline joint portion formed on an inner peripheral surface of the tubular member, the tubular member being spline-connected to the shaft member by inserting the first end side of the shaft member from an end side of the tubular member so as to permit axial sliding movement of the tubular member relative to the shaft member;
an axial impact absorber structured to absorb axial impact via relative sliding movement between the female spline joint portion and the male spline joint portion spline-connected to each other;
a seal member configured to prevent entry of foreign matter from an outside into a spline-connected section of the female spline joint portion and the male spline joint portion; and
the seal member housing structured to house the seal member, the seal member housing being formed of a diametrically-enlarged portion, which is formed at a position to confront the first diameter portion in a radial direction, and configured to have an inside diameter greater than a diameter of a dedendum circle of the female spline joint portion, and a retainer fixedly connected to the end side of the tubular member,
wherein the seal member is held in a compressed state between the seal member housing and the first diameter portion, and
wherein the seal member is positioned in a manner so as to be at an axial position of the second diameter portion of the shaft member when the tubular member slides relative to the shaft member in the second axial direction via the female spline joint portion and the male spline joint portion which are spline-connected to each other.

9. The propeller shaft as recited in claim 8, wherein:
the shaft member is formed with the male-spline-joint formed part on which the male spline joint portion is formed, and an outer peripheral seal surface formed from the male-spline-joint formed part toward an end side of the shaft member facing the second axial direction, and configured to be kept in abutted-engagement with the seal member.

10. The propeller shaft as recited in claim 9, wherein:
the retainer is formed with an insertion through hole into which the shaft member is inserted; and
an inside diameter of the insertion through hole is dimensioned to be greater than at least an outside diameter of the outer peripheral seal surface.

11. The propeller shaft as recited in claim 8, wherein:
the seal member and the retainer are formed integral with each other as a single seal structural body; and
the single seal structural body is housed in the seal member housing.

12. The propeller shaft as recited in claim 8, wherein:
the retainer is brought into abutted-engagement with the male-spline-joint formed part of the shaft member on which the male spline joint portion is formed, when the tubular member slides relative to the shaft member in the first axial direction via the female spline joint portion and the male spline joint portion spline-connected to each other.

13. The propeller shaft as recited in claim 12, wherein:
the inside diameter of the insertion through hole of the retainer is dimensioned to be less than a diameter of an addendum circle of the male spline joint portion formed on the shaft member.

14. The propeller shaft as recited in claim 8, wherein:
the retainer comprises an elastically deformable retainer member installed on and kept in elastic-contact with an inner peripheral wall of the tubular member.

15. The propeller shaft as recited in claim 14, wherein:
the tubular member has a recessed groove formed in the inner peripheral wall of the tubular member; and
the elastically deformable retainer member is configured to be fitted and snapped back into the recessed groove.

16. The propeller shaft as recited in claim 8, wherein:
the retainer is radially interposed between an inner peripheral wall of the tubular member and the seal member; and
the seal member is retained between an outer periphery of the shaft member and an inner periphery of the retainer with compressive deformation.

17. The propeller shaft as recited in claim 8, wherein:
the end side of the tubular member is arranged to face toward a rear side of a vehicle when the tubular member is installed on the vehicle.

18. A propeller shaft comprising:
a first shaft member having a male spline joint portion, a first diameter portion, and a second diameter portion which are formed on an outer peripheral surface of the first shaft member, and which are positioned axially in order of the male spline joint portion, the first diameter portion, and the second diameter portion from a first end side of the first shaft member facing a first axial direction of two opposite axial directions,
the first diameter portion having an outside diameter smaller than an outside diameter of a male-spline-joint formed part on which the male spline joint portion is formed, and
the second diameter portion having an outside diameter smaller than the outside diameter of the first diameter portion;
a second shaft member having a seal member housing and a female spline joint portion that are positioned axially in order of the seal member housing and the female spline joint portion from an end side of the second shaft member facing a second axial direction opposite to the first axial direction, and having an axial bore configured to axially insert the first end side of the first shaft member, from the end side of the second shaft member;
an engagement device structured to permit relative sliding movement between the first shaft member and the second shaft member in the axial bore and to prevent relative rotation between the first shaft member and the second shaft member in the axial bore;
the seal member housing formed at a position to confront the first diameter portion in a radial direction as a diametrically-enlarged portion whose diameter is greater than an inside diameter of the axial bore, and the diametrically-enlarged portion being configured to have a radially-extending inside wall surface and a cylindrical inner peripheral surface formed continuously from the radially-extending inside wall surface so as to position a seal member in the diametrically-enlarged portion, and to provide sealing between the first shaft member and the second shaft member; and
a retainer fixedly connected to the end side of the second shaft member and formed with an insertion through hole into which the first shaft member is inserted, and configured to define the seal member housing in cooperation with the diametrically-enlarged portion,
wherein the seal member is held in a compressed state between the seal member housing and the first diameter portion, and
wherein the seal member is positioned in a manner so as to be at an axial position of the second diameter portion of the first shaft member when the second shaft member slides relative to the first shaft member in the second axial direction via the female spline joint portion and the male spline joint portion which are spline-connected to each other.

19. The propeller shaft as recited in claim 18, wherein:
the engagement device belonging to the first shaft member includes a male spline joint portion;
the first shaft member is formed with the male-spline-joint formed part on which the male spline joint portion is formed, and a non-splined section formed from the male-spline-joint formed part toward a second end side of the shaft member facing the second axial direction; and
an inside diameter of the insertion through hole is dimensioned to be greater than at least an outside diameter of the non-splined section.

20. The propeller shaft as recited in claim 18, wherein:
the seal member and the retainer are formed integral with each other as a single seal structural body; and
the single seal structural body is housed in the seal member housing.

\* \* \* \* \*